(12) United States Patent
Sobel et al.

(10) Patent No.: US 7,536,724 B1
(45) Date of Patent: May 19, 2009

(54) RISK PROFILING FOR OPTIMIZING DEPLOYMENT OF SECURITY MEASURES

(75) Inventors: William E. Sobel, Stevenson Ranch, CA (US); Bruce E. McCorkendale, Los Angeles, CA (US)

(73) Assignee: Symantec Corporation, Cupertino, CA (US)

( * ) Notice: Subject to any disclaimer, the term of this patent is extended or adjusted under 35 U.S.C. 154(b) by 875 days.

(21) Appl. No.: 10/677,730

(22) Filed: Oct. 1, 2003

(51) Int. Cl.
*G06F 21/00* (2006.01)
(52) U.S. Cl. ...................................... 726/25
(58) Field of Classification Search ............... 726/1, 726/22–27; 713/188, 189; 709/223–226
See application file for complete search history.

(56) References Cited

U.S. PATENT DOCUMENTS

| | | | |
|---|---|---|---|
| 6,895,512 B1 * | 5/2005 | Calbucci | 726/3 |
| 6,938,156 B2 * | 8/2005 | Wheeler et al. | 726/20 |
| 2003/0051026 A1 * | 3/2003 | Carter et al. | 709/224 |
| 2004/0044912 A1 * | 3/2004 | Connary et al. | 709/224 |

* cited by examiner

*Primary Examiner*—Gilberto Barron, Jr.
*Assistant Examiner*—Abdulhakim Nobahar
(74) *Attorney, Agent, or Firm*—Van Pelt, Yi & James LLP (57) ABSTRACT

Risk profiling in order to optimize the deployment of security measures such as behavior-blocking, hardening, or securing techniques is disclosed. Risk profiling includes evaluating a risk to a host service based on communication with a remote system, creating a risk profile for the host service, and deploying a security measure to protect the host service based on the risk profile. Risk profiling enables optimization of deployment of security measures to protect a host service that is either directly or indirectly communicating with a remote system. Using a risk profile enables the optimal deployment of security measures while preventing host system performance degradation and increased system requirements (e.g., increased memory and processor usage).

10 Claims, 6 Drawing Sheets

RISK PROFILING FOR OPTIMIZING DEPLOYMENT OF SECURITY MEASURES

FIELD OF THE INVENTION

The present invention relates generally to security software. More specifically, application risk profiling for optimizing deployment of security measures is disclosed.

BACKGROUND OF THE INVENTION

A host (e.g., a networked computer) can be attacked by a remote system (e.g., another networked computer, terminal, host, etc.) at various host services such as applications, processes, and routines. Attacks can include viruses, hacking, denial of service attacks, data corruption, and other destructive or exploitive measures. Host services can include processes, applications, or other routines/programs that use an external port to exchange data with a remote system. Conventional security measures vary, ranging from personal firewall software to behavior blocking techniques. Typically, such security measures may include behavior blocking, hardening, securing and other security-related techniques. However, conventional security measures can burden host performance and resources. For example, traditional firewall software can indiscriminately apply security measures to all host services, degrading both performance and available system resources, such as memory and processor availability. Alternatively, less comprehensive security measures can protect certain services, but often exclude others and cannot dynamically provide protection as needed.

A host may have vulnerabilities that can be exploited by a remote system. Using a network connection, a remote system can gain unauthorized access to a host over an external port. Host services and processes "listening" on external ports (external applications) can be exploited directly or inadvertently permit the exploitation of internal host services that are using an external application. External applications can act as a gateway for remote systems to gain access to other host services that do not directly communicate over an external port.

If a remote system gains access to a port on a host, it can exploit services listening on the port, illicitly retrieving, corrupting, copying, or destroying data and services on the host. However, given the limited resources and performance expectations of a host, security measures to guard against these attacks cannot be universally applied to all host services. In other words, conventional solutions cannot protect a host without degrading system performance or substantially burdening storage and computing resources.

Thus, there is a need for a solution whereby security measures can be applied to both internal and external applications on a host and minimize the overall burden on the system. There is also a need for a solution whereby the application of security measures can be prioritized to protect external applications from remote attacks as well as other processes that externally communicate indirectly using external applications.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Techniques disclosed herein can be used to profile and protect host services without overly burdening host system resources. As new threats emerge and as security measures are developed to combat them, techniques for assessing risks associated with various applications and dynamically deploying appropriate protection and security measures is important, particularly for conserving system resources.

Figure 1:
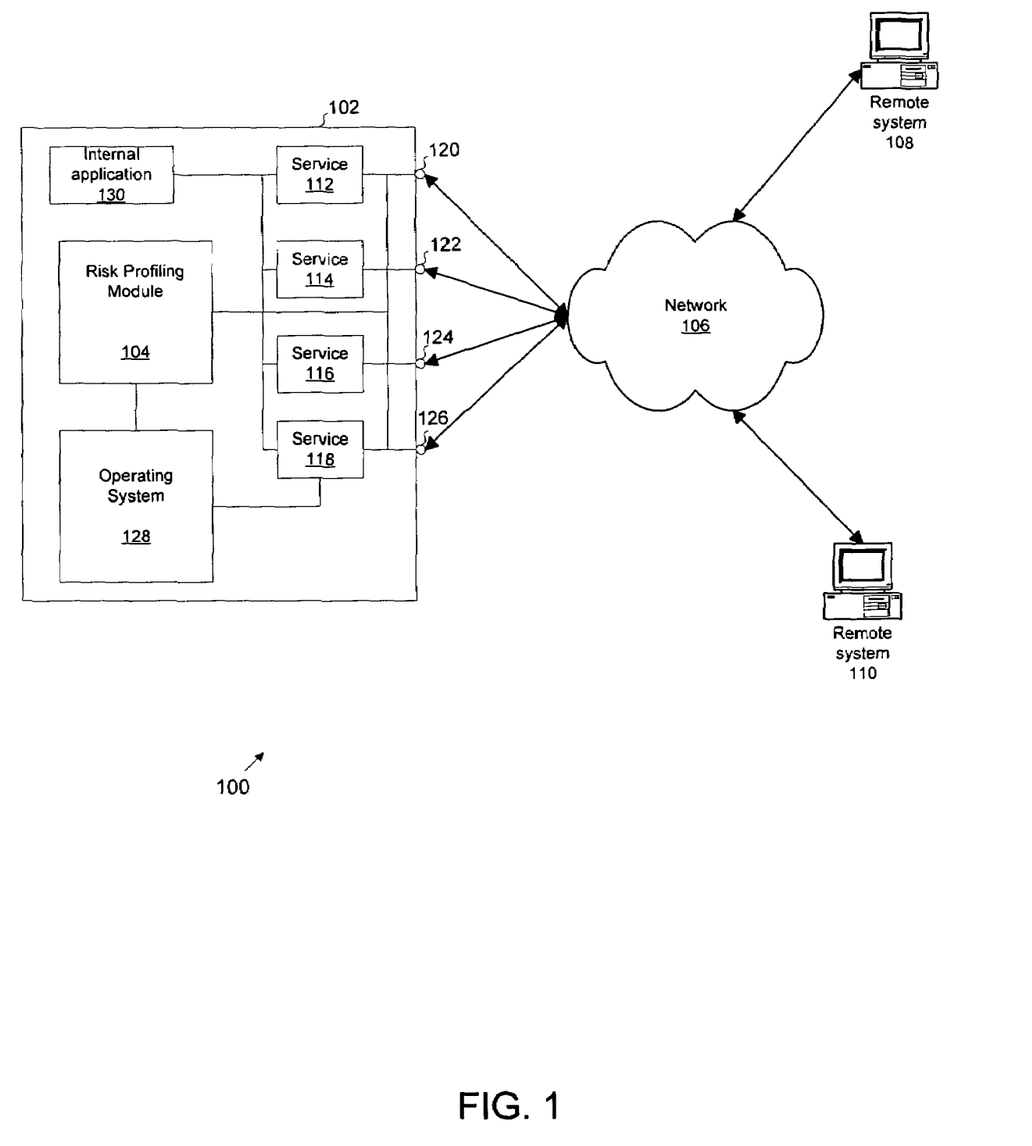
FIG. 1 is an illustration of an exemplary risk profiling system 100.

FIG. 1 is an illustration of an exemplary risk profiling system 100. A host 102 includes a risk profiling module 104 communicating over network 106 to remote systems 108 and 110. In this example, remote systems can include both authorized and unauthorized clients or systems that are attempting to gain access to host 102. Within host 102 are host services 112-118, communicating over ports 120-126. Host services can include applications, network services, and other programs running on a host, such as host 102. Host services can also include external applications as well as internal applications communicating through them. External applications can be host services that are in direct external communication with a remote system (e.g., client, server, host, terminal, etc.). Operating system 128 manages host services 112-118 and provides an operating platform for host 102. In this example, internal application 130 (which can be defined as a host service) is also shown, communicating over ports 120-126 using host services 112-118.

Figure 2:
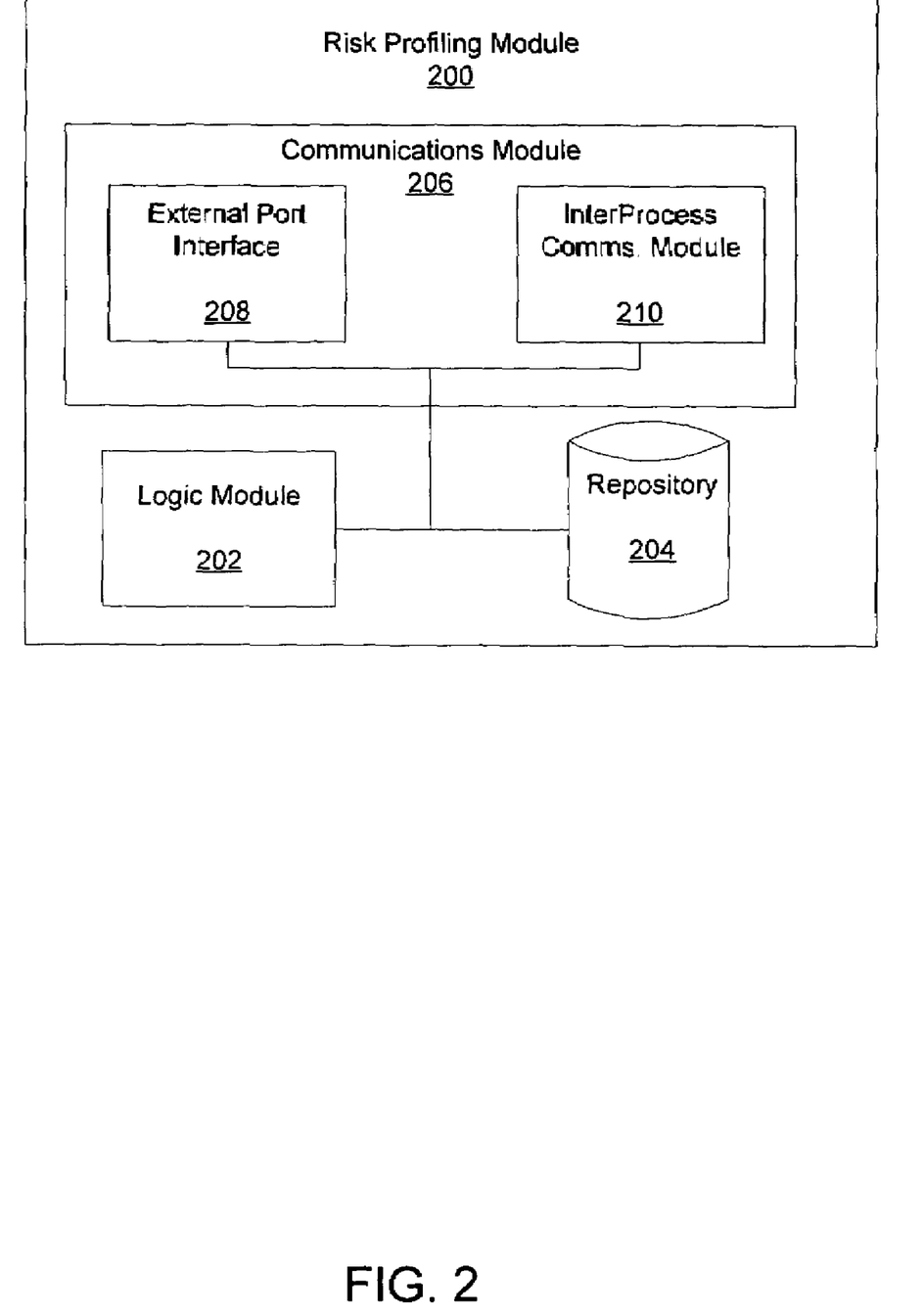
FIG. 2 is a diagram illustrating an exemplary risk profiling module 200.

FIG. 2 is a diagram illustrating an exemplary risk profiling module 200. Logic module 202 retrieves and stores data in repository 204. Repository 204 can be implemented using any type of database or data storage utility or facility. Communications module 206 includes external port interface module 208 and interprocess communications module 210. External port interface module 208 and interprocess communications module 210 are included within communications module 206. In this embodiment, external port interface module 208 provides an interface between communications module 206 and external applications. In other embodiments, external port interface abilities may be provided by an operating system that can be "hooked" in order to access and use relevant data. Hooking an application (e.g., an API) can include using the application to gain access, sample, retrieve, request, or use data from another application. Hooking may also include tapping into other applications to gather state information about a particular system, host, machine, etc. Host services listening on external ports use external port interface module 208, which risk profiling module 200 uses to evaluate incoming data traffic. An external application uses an external port in order to communicate a request for data or access to data/information stored on the host. The external port interface module 208 provides data related to these external requests to risk profiling module 200.

Risk profiling module 200 assesses risk using logic module 202 and data stored in repository 204. The stored data may include samples from binaries of executable files, API bit stream data, or other data packets sent by a remote system to a host. API bit stream data may include values intercepted or hooked from API calls to other systems (e.g., operating system 128). Status information from a running system may also be included in API bit stream data. It is also possible to determine system information without hooking into system processes such as calling an API or hooking operating system 128. The stored data provide indications to risk profiling module 200 of external communications, either directly or over interprocess communications. External port interface 208 can determine whether an external call or request has occurred to a host service. Incoming data packets can be sampled and stored by risk profiling module 200 using external port interface 208.

In other embodiments, these modules may be implemented apart from communications module 206. Regardless of implementation, external port interface module 208 provides samples from incoming data traffic directly to external applications (e.g., services 112-118 communicating over ports 120-126, information about which ports are being used). In some embodiments, determining that a port is being used may be as useful as determining the actual data transmitted over the port. Likewise, interprocess communications module 210 provides samples from data communications between an internal host service (i.e., internal application 130) communicating externally via an external application (i.e., services 112-118).

Risk profiling module 200 develops risk profiles host services to determine risks to host services and optimization of deployment of security measures to protect them. Security measures may include host-based behavior blocking and related hardening techniques. Risks can include remote systems conducting direct attacks on external applications or indirect attacks on internal host services using interprocess communications (e.g., attacking a common out-of-proc corn object). Interprocess communications refers to one host service indirectly communicating with an external application.

For indirect communication, interprocess communications module 210 can determine if a host service is at risk. Logic module 202 receives data from interprocess communications module 210 and can develop a profile if an internal application is communicating with an external application. In this example, logic module 202 identifies the host service and assembles a risk profile based on data it is receiving from interprocess communications module 210 and/or external port interface 208. Risk profiling module 200 can assign a security measure and store a risk profile for a particular host service.

By evaluating external ports for direct communication or calls from external applications, risk profiling module 200 creates a profile for each host service engaged in external communication. The identified host services are then protected by various types of security measures.

In interprocess communications, an internal host service (i.e., one that does not have direct access over a communications port) can exchange data with an external application in order to send or receive data from a remote system. For example, a spreadsheet application can be run on a host, but may not have external communication with another remote system or host running a similar spreadsheet. By transferring data using interprocess communications with an e-mail application, the spreadsheet application, in this example, is able to send data to a remote system. After assessing direct and indirect attack risks, risk profiling module 200 can determine what security measures should be applied to host services based on the risk profiles.

Risk profiling module 200 can categorize and prioritize host services based on user-configurable rules, performance criteria, or other factors set or selected by the user or the host. Security measures such as anti-virus, behavior blocking, vulnerability assessment, encryption, encoding, hardening, and other related techniques can be used to protect host services. Further, risk profiling module 200 can target the application of security measures to a set of host services having greater risks than others. Risk profiling can be used to determine what security measures should be applied and how they should be applied to host services. The discriminate application of security measures using risk profiles eliminates the need for large storage and processing requirements on the host. By using risk profiles of host services, the deployment of security measures can improve host performance and protection.

Figure 3A:
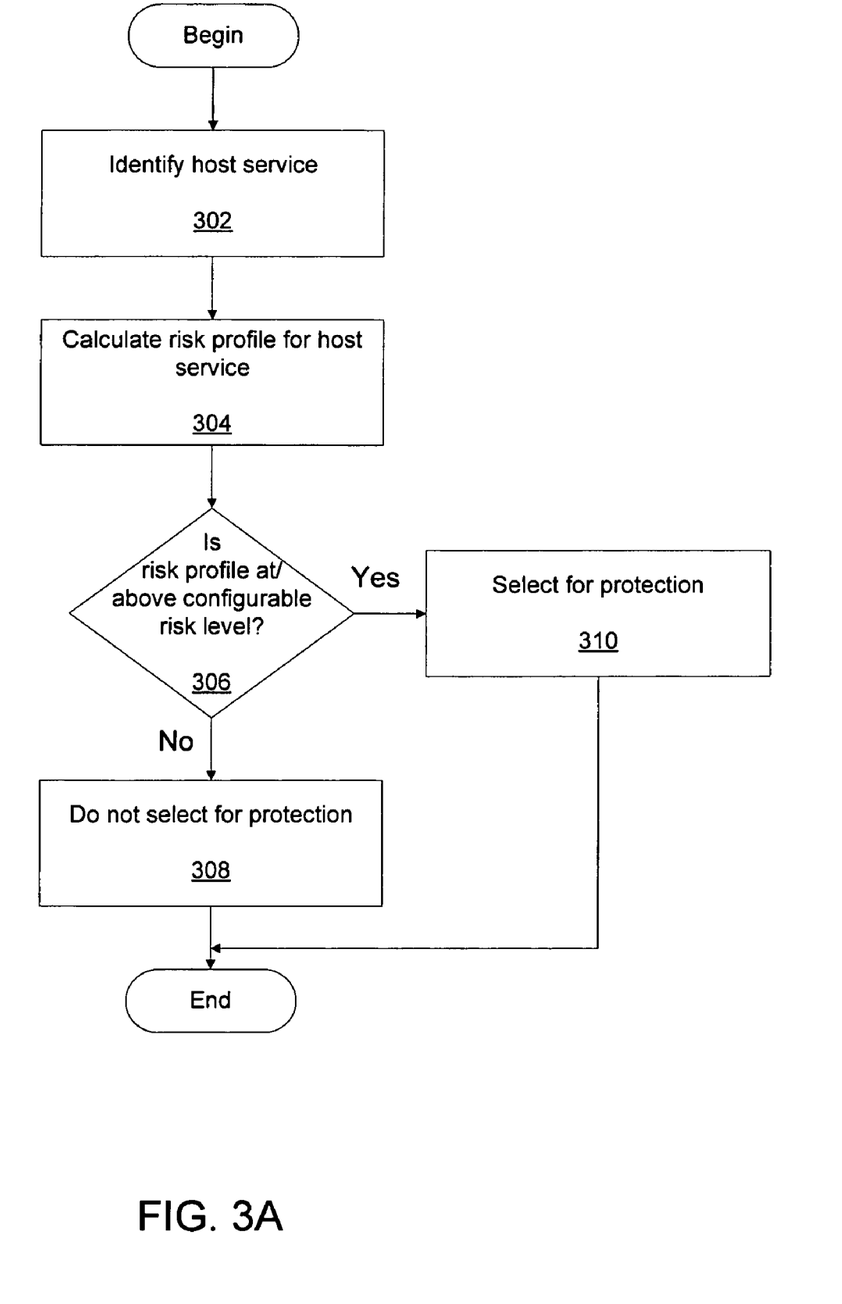
FIG. 3A illustrates an exemplary method of risk profiling a host service.

FIG. 3A illustrates an exemplary method of risk profiling a host service. Risk profiling module 200 identifies all host services (302). Once identifies, a risk profile is calculated for each host service (304). The calculation of risk profiles is described in further detail in connection with FIG. 3B. Once a risk profile has been calculated, the risk profile can be compared to a configurable risk level (306). The configurable risk level can be pre-defined, user-specified, or automatically set. The purpose of a configurable risk level is to provide a baseline for the performance or risk profiling module 200. Risk profiles that do not meet or exceed the configurable risk level are often left alone, but can be selected for protection based on other criteria (308). Risk profiles that exceed the configurable risk level can be selected for security measure or protection (310).

Using risk profiles enables both the protection of host services as well as the optimization of host resources and performance while implementing security measures. A risk profile is an assessment of the type of risk and/or the level of risk associated with a process. In general, attributes of a risk profile are defined based on the host service and type of vulnerability. For example, if a particular host service is available on port 10 for 20 minutes to enable remote administration of the host operating system, then a risk profile might be high. Assigned attributes could include the period of vulnerability (20 minutes), priority for protection because the operating system is exposed (priority-high), and the port number (port=10). Thus a security measure (e.g., personal firewall software) may be implemented based on the risk profile in order to prevent an attack on the host operating system.

A risk profile can also be developed using user or system-specified rules. These configurable rules may specify particular types of host services for protection, modify or specify default priorities, or the type of security measure to be used for specific host services (e.g., suppression of OS responses to a probe or scan).

Once profiled, host services can be protected using security measures. Using risk profiles to dynamically implement a security measure for a host service provides comprehensive protection while reducing system resource and processing requirements on the host. In other words, security measures may be dynamically deployed to protect host services if and when they are needed. This reduces the burden on the host, eliminating resource requirements typically required by if simultaneously applying security measures to all host services. In order to implement security measures, a risk profile can be assembled using sample data from a variety of sources.

Risk profiling involves identifying host services that may include external applications or internal host applications engaged in interprocess communications. Some examples of interprocess communications may include services listening on local ports, RPC/out of process COM objects, shared memory, named pipes, Windows/operating system messaging, service messaging, device input/output control messaging, and other forms not specifically listed. In one embodiment, sample data can be taken from binary executable files or run-time hooking of host services via application programming interfaces (APIs). Preferably, risk profiling gathers sample data related to host service attributes. Host service attributes are detected and weighed in order to generate a risk profile. A given weight determines how much and in what order a particular host service is to be protected. By detecting or evaluating these attributes, a risk level can be determines and assigned to a risk profile. In this example, based on comparing the risk level to a configurable risk-level, security measures can be assigned an implemented.

The identification of host service attributes can be implemented using a combination of static combination of binary executable files of the host services (e.g., examining import tables for calls to APIs related to interprocess communication) and run-time hooking of host services. Run-time examination may be necessary to determine dynamically established communications and to full determine direct and indirect communications among host services. In other words, risk profiling can be performed by identifying all host services exhibiting evidence (i.e., sample data) of listening on an external port and/or hosting any type of interprocess communication, thereby assuming that external vulnerabilities to remote systems exists and, therefore, requires protective security measures.

Sample data taken in the above examples provide an indication to risk profiling module 200 that a particular host service is at risk. Risk levels can be assigned to a risk profile if a host service is communicating externally. Risk levels can also be assigned to a risk profile if a host service is listening on a port, although it is not receiving data. Probes, scans, connection requests, and other incoming data traffic provide indication that a host service is listening on an external port and vulnerable to attack. However, via hooking, it may be possible to determine whether a port is open, regardless of whether any data traffic is flowing over the port.

Figure 3B:
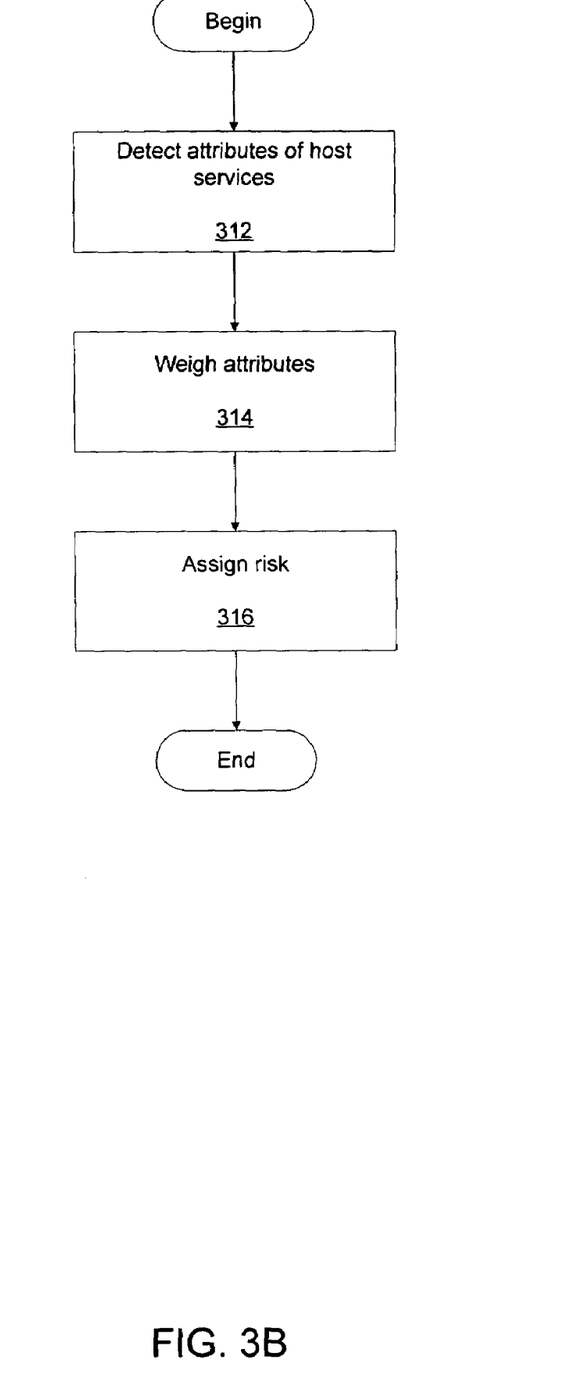
FIG. 3B illustrates an exemplary method for calculating a risk profile.

FIG. 3B illustrates an exemplary method for calculating a risk profile. Risk profiling module 200 detects attributes, as described above, for host services that may be engaged in direct external communications (e.g., external applications) or indirect external communications (e.g., interprocess communications) (312). Host service attributes are then analyzed and weighted (314). Once weighted, a risk level is developed and assigned to a risk profile (316). Based on the risk level, security measures can be assigned to protect the host services.

Figure 4A:
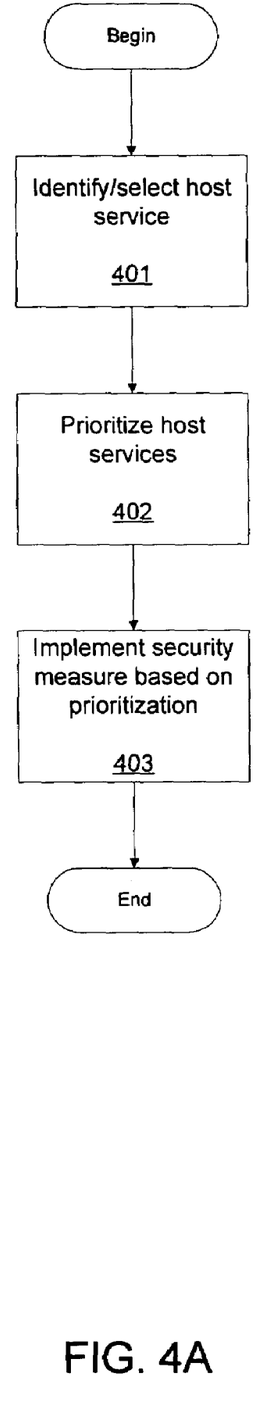
FIG. 4A is a flow chart illustrating an alternative method for risk profiling.

FIG. 4A is a flow chart illustrating an alternative method for risk profiling. Risk profiling module 200 identifies host services that are communicating with external applications (401). Host services can be prioritized based on risk profiles (402). Risk profiles take into account the type of host service engaged in external communications. If the host service is directly communicating over an external port, a security measure can be implemented (such as port stealthing or blocking). If a user configures risk profiling module 200 to prioritize host services, then a priority may be assigned to a risk profile.

In other embodiments, other factors can be taken into account when developing a risk profile. Factors such as the type of host service, the importance (to either the user or the host) of the host service, attributes such as the name of the service or data accessible to the service, and other user-specified criteria can provide default or overriding values when assembling and using risk profiles. After prioritizing host services requiring protection, security measures can be implemented, based on each risk profile (403).

Figure 4B:
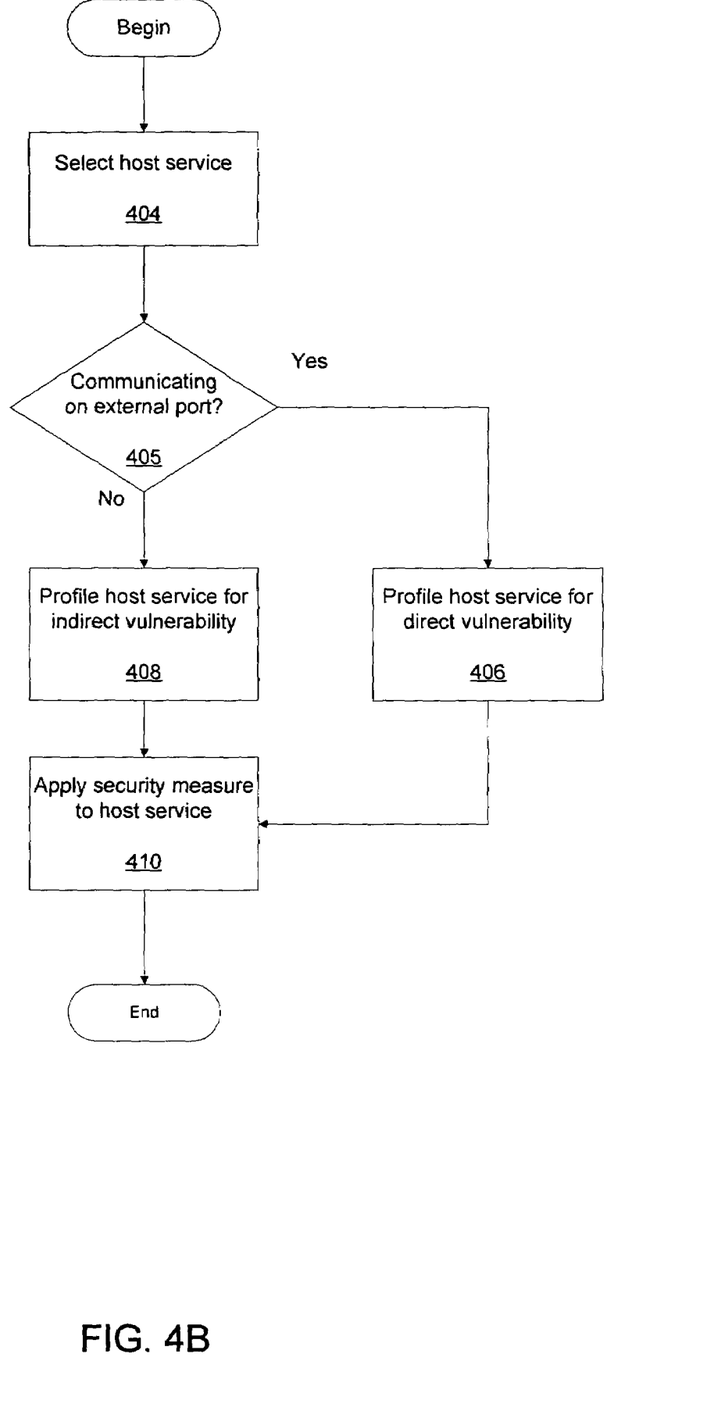
FIG. 4B is a flow chart illustrating an alternative method for risk profiling in order to optimize deployment of security measures.

FIG. 4B is a flow chart illustrating an alternative method for risk profiling in order to optimize deployment of security measures. Risk profiling module 200 (FIG. 2) selects a host service for profiling (404) and to determine whether the host service is communicating over an external port (405). If the host service is communicating over an external port, then risk profiling module 200 determines a profile for a direct vulnerability (406). If risk profiling module 200 is not directly communicating over an external port, then risk profiling module 200 determines if it is communicating indirectly through one or more host services that are on an external port (408). Regardless of whether the profiled risk is direct or indirect, protection is applied to the host service based on the risk profile (410).

Sampled incoming data traffic may indicate a risk of attack, both direct and indirect, from a remote system or the existence of a channel, regardless of whether or not it is in use. By monitoring incoming data traffic, risk profiling module 200 can determine if a security measure should be applied. Risk profiles also aid in determining the priority of a host service when applying a security measure. As not all host services may be engaged in external communications at the same moment, security measures do not need to be applied to all host services at the same moment. Subsequently, system resources such as processor time are not over burdened by security measures, if assigned and implemented based on risk profiling as described above. Further profiling can include determining the type of specific risk and other details. In another embodiment, the same result may be achieved by monitoring APIs using integration with a monitoring routine with each API of every application.

If risk profiling module 200 determines that either sampled binaries or APIs have revealed a threat, then a priority code is assigned to the host service. Based on the priority code, security measures are invoked. Priority codes may be implemented as a tag, field, bit string, or other indicator in the repository of risk profiling module 200 in order to generate an order in which host services are protected. Other techniques for assigning priority codes are used in other embodiments.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method for securing a host service comprising:

evaluating at a host on which the host service is running a risk to the host service based on communication with a remote system;

creating at the host a risk profile for the host service; and deploying a host-based security measure to protect the host service based on the risk profile;

wherein the host service is one of a plurality of host services, each of which has a corresponding risk profile, and the host-based security measure is deployed with respect to each host service in at least a subset of the plurality of host services, the need for the host-based security measure having been determined for each host service, on a host service by host service basis, based at least in part on the corresponding risk profile of the host service.

2. A method for securing a host service as recited in claim 1 wherein creating a risk profile includes assigning a priority to the risk profile.

3. A method for securing a host service as recited in claim 1 wherein evaluating a risk to the host service further includes determining if the host service calls an interface.

4. A method as recited in claim 1 wherein profiling a risk on the host further includes determining if an external application requests access to the host.

5. A method as recited in claim 1 wherein profiling a risk on the host further includes requesting data from the host.

6. A method as recited in claim 1 wherein evaluating a risk to the host service further includes determining if the application is directly exchanging data with an external application.

7. A method as recited in claim 1 wherein creating the risk profile further includes determining if the application is indirectly exchanging data with the remote system.

8. A method as recited in claim 1 wherein creating the risk profile includes evaluating a file.

9. A method as recited in claim 1 wherein creating the risk profile includes evaluating a programming interface.

10. A computer program product for profiling a risk on a host, the computer program product being embodied in a computer readable storage medium and comprising computer instructions for:

evaluating at a host on which the host service is running a risk to the host service based on communication with a remote system;

creating at the host a risk profile for the host service; and deploying a host-based security measure to protect the host service based on the risk profile;

wherein the host service is one of a plurality of host services, each of which has a corresponding risk profile, and the host-based security measure is deployed with respect to each host service in at least a subset of the plurality of host services, the need for the host-based security measure having been determined for each host service on a host service by host service basis, based at least in part on the corresponding risk profile of the host service.

* * * * *